J. W. McLEOD.
SCRAPER.
APPLICATION FILED AUG. 18, 1919.

1,322,033.

Patented Nov. 18, 1919.

Inventor
John W. McLeod
By his Attorneys

UNITED STATES PATENT OFFICE.

JOHN W. McLEOD, OF BROOKLYN, NEW YORK.

SCRAPER.

1,322,033.　　　Specification of Letters Patent.　　Patented Nov. 18, 1919.

Application filed August 18, 1919. Serial No. 318,090.

*To all whom it may concern:*

Be it known that I, JOHN W. McLEOD, a citizen of the United States, and residing at Brooklyn, in the county of Kings and State of New York, have invented certain new and useful Improvements in Scrapers, of which the following is a specification, such as will enable those skilled in the art to which it appertains to make and use the same.

This invention relates to scrapers and particularly to devices of this class designed for use in scraping the hulls of boats, vessels, ships and the like to remove or free dirt, shells and other foreign substances therefrom; and the object of the invention is to provide a device of the class and for the purpose specified which is simple in construction and operation and efficient in use and which is so designed as to remove foreign substances or matter from the hulls of boats, vessels, ships and the like without injuring or removing the paint on said hull; and with this and other objects in view the invention consists in a device of the class and for the purpose specified, constructed as hereinafter described and claimed.

The invention is fully disclosed in the following specification, of which the accompanying drawing forms a part, in which the separate parts of my improvement are designated by suitable reference characters in each of the views, and in which:—

Figure 1 is a diagrammatic side view of a boat and indicating the method of operating or manipulating the scraper about the hull of said boat;

Fig. 2 a plan view of the scraper device detached and on an enlarged scale; and, Fig. 3 a transverse section on the line 3—3 of Fig. 2.

In the practice of my invention, I provide a scraper device 5 which is composed of two long parallel bars 6 and 7, and two shorter transverse bars 8 and 9 secured thereto to form the frame of the device. The bottom faces of the bars 6 and 7 are each provided with angularly arranged blades 10 which converge outwardly and diverge inwardly, as shown, and each of these blades is made from angle-iron strips 11, the bottom flanges 12 of which are secured to the bars 6 and 7 by screws 13, and the projecting flanges 14 of which serve as the cutting edges of the blades 10. A cable or rope attaching member 15 is pivotally mounted between and to the bars 8 and 9, as shown at 16, and the central side portions of which are V-shaped in form as shown at 17 and two ropes or cables 18 and 19 are connected with the separate V-shaped portions 17 of the member 15 as shown in Fig. 2.

In Fig. 1 I have diagrammatically illustrated the use of the scraper device 5 and in said figure I have indicated at 20 a boat, vessel or ship provided with two winch devices 21 and 22 and pulleys 23 and 24 mounted in the fore and aft ends of the boat, vessel or ship 20. In practice, the cable or rope 18 is passed around the pulley 23 and secured to the winch device 21, while the cable or rope 19 passes around the pulley 24 and is secured to the winch device 22.

In the operation of the device the winches 21 and 22 are operated to move the scraper device over the hull of the boat, vessel or ship 20, and in this operation the blades 10 which bear on the face of the hull operate to clean off, or scrape off dirt, shells or any other foreign substance or matter from said hull. It will be seen by the angular arrangement or converging arrangement of the blades 10 on the bars 6 and 7 that the dirt, shells or other substance will be thrown or moved outwardly from the scraper device in the manner of a plow device, keeping the scraper clean or free from the collecting of the foreign matter therein.

It will be understood that while I have shown a specific form of scraper device and a specific arrangement of blades thereon, my invention is not limited to these details, and various changes in and modifications of the device or use thereof as herein described may be made, within the scope of the appended claims, without departing from the spirit of my invention or sacrificing its advantages, and it will also be understood that with the apparatus shown and described for operating my improved scraper, the said scraper is moved longitudinally of the hull of the vessel and other pulleys arranged laterally of the pulleys 23 and 24 and supplemental thereto may be employed and around them the ropes or cables 18 and 19 will also be passed for operating the scraper on the sides of the hull of the vessel.

It will also be understood that my improved scraper is particularly designed for use in cleaning off the hulls of boats, vessels and ships while the same are afloat thus eliminating the necessity of placing such boats, vessels or ships in a dry dock to produce the desired result, and this operation of cleaning off the hull will or can be accomplished while at sea.

Having fully described my invention, what I claim as new and desire to secure by Letters Patent, is:—

1. A scraper device of the class described comprising a framework composed of two bars connected by two transverse bars, one of the faces of said first named bars being provided with a plurality of angularly arranged blades, and means pivotally connected with said framework whereby the device may be manipulated.

2. A scraper device of the class described comprising a framework composed of two bars connected by two transverse bars, one of the faces of said first named bars being provided with a plurality of angularly and convergingly arranged blades, a member pivotally connected with the transverse bars of said framework, and means connected with said member whereby the device may be manipulated.

3. A scraper device of the class described comprising a framework composed of two bars connected by two transverse bars, one of the faces of said first named bars being provided with a plurality of angularly and convergingly arranged blades, said blades being each composed of angle-iron strips one side of which are secured to said bars and the projecting sides of which form the cutter portions of said blades, a rope attaching member pivotally connected with said transverse bars and ropes connected with the opposite sides of said member whereby the device may be manipulated.

4. A scraper device of the class described consisting of a framework composed of two pairs of bars arranged at an angle to each other, and a plurality of angularly and convergingly arranged cutter blades on one of said pairs of bars, the cutter blades on one of the bars of said pair converging in an opposite direction to that of the cutter blades on the other bar.

5. A scraper device of the class described comprising an oblong frame composed of long sides and short ends and an elongated aperture between said sides, and a plurality of cutter blades angularly and convergingly arranged on and secured to one face of the long sides of the frame, said cutter blades converging outwardly to each side of the frame.

In testimony that I claim the foregoing as my invention I have signed my name in presence of the subscribing witnesses this 14th day of August 1919.

JOHN W. McLEOD.

Witnesses:
C. E. MULREANY,
H. E. THOMPSON.